United States Patent
Nelson

(10) Patent No.: US 7,078,906 B2
(45) Date of Patent: Jul. 18, 2006

(54) SIMULTANEOUS TIME-DOMAIN AND FREQUENCY-DOMAIN METAL DETECTOR

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 97 days.

(21) Appl. No.: 10/942,146

(22) Filed: Sep. 16, 2004

(65) Prior Publication Data

US 2005/0062477 A1 Mar. 24, 2005

Related U.S. Application Data

(60) Provisional application No. 60/505,061, filed on Sep. 23, 2003.

(51) Int. Cl.
*G01V 3/08* (2006.01)
*G01V 3/10* (2006.01)
*G01N 27/72* (2006.01)
*G01V 3/15* (2006.01)

(52) U.S. Cl. .................. 324/327; 324/239; 324/326

(58) Field of Classification Search .......... 324/207.26, 324/326–329, 228, 234, 236, 336, 323, 239, 324/243, 207.17, 327; 340/568.1, 540, 686.6, 340/551

See application file for complete search history.

(56) References Cited

U.S. PATENT DOCUMENTS

| | | | |
|---|---|---|---|
| 5,506,506 A | | 4/1996 | Candy |
| 5,537,038 A | * | 7/1996 | Ando ........................ 324/253 |
| 5,537,041 A | | 7/1996 | Candy |
| 5,583,434 A | * | 12/1996 | Moyers et al. ......... 324/207.16 |
| 5,682,097 A | * | 10/1997 | Bryant et al. .......... 324/207.17 |
| 5,767,672 A | | 6/1998 | Guichard et al. |
| 5,767,679 A | | 6/1998 | Schroder |
| 6,150,817 A | | 11/2000 | Lurie et al. |
| 6,424,146 B1 | * | 7/2002 | Demma et al. ........ 324/207.16 |
| 6,967,574 B1 | * | 11/2005 | Nelson ...................... 340/551 |
| 2003/0052684 A1 | | 3/2003 | Nelson |
| 2003/0184299 A1 | * | 10/2003 | Strack ....................... 324/323 |
| 2004/0061511 A1 | * | 4/2004 | Kawakatsu ................ 324/707 |
| 2004/0119475 A1 | * | 6/2004 | Earle ......................... 324/329 |

\* cited by examiner

*Primary Examiner*—Edward Lefkowitz
*Assistant Examiner*—Kenneth J. Whittington
(74) *Attorney, Agent, or Firm*—Albert J. Fasulo, II

(57) ABSTRACT

A metal detector capable of operating in both a time-domain mode and a frequency-domain mode includes a transmitter component and a receiver component. The transmitter component includes a transmitter coil that can receive both an AC and DC current source for frequency-and time-domain operation respectively. The AC signal is impressed on the DC signal such that while the transmitter coil is charging, frequency-domain sensing is occurring and when the transmitter coil is switched off, time-domain sensing is occurring. The receiver component uses a primary field bucking method to ensure that both time-and frequency-domain modes can operate with the receiver coil.

7 Claims, 4 Drawing Sheets

SIMULTANEOUS TIME-DOMAIN AND FREQUENCY-DOMAIN METAL DETECTOR

CROSS-REFERENCE TO RELATED APPLICATIONS

This application claims the benefit of U.S. provisional application No. 60/505,061, filed on Sep. 23, 2003, which is incorporated herein by reference in its entirety.

STATEMENT OF GOVERNMENTAL INTEREST

This invention was made with U.S. Government support under Army contract no. DAAB-15-00-C-1008. The U.S. Government has certain rights in this invention.

BACKGROUND

There are an estimated 100 million mines and countless millions of acres of land contaminated with unexploded ordnance (UXO) worldwide. Thus, there is a need for sensor systems and methods that can detect and identify large and small metal objects buried in soil. Such objects often are mines and UXOs.

A commonly used sensor for mine and UXO detection is the electromagnetic induction (EMI) metal detector. Conventional EMI metal detectors use either frequency-domain (FD) or time-domain (TD or pulse) eddy current methods and can detect small metal targets (such as plastic-cased low-metal content mines) at shallow depths and large metal targets (such as metal-cased high-metal content mines and UXOs) at both shallow and deep depths under a wide range of environmental and soil conditions. However, metal non-mine (i.e., clutter) objects commonly found in the environment pose a major problem in identifying mines and UXO. That is because these clutter objects create false alarms when detected by a metal detector. For time-efficient and cost-effective land clearing, the detected metal targets must be classified as to their threat potential: mine, UXO or clutter. Preferably, these metal targets need to be classified in real-time or near real-time.

There are two major issues with EMI metal detectors. The first issue is the detection of metal and the second issue is metal discrimination. In the case of detection, both time-domain (TD) and frequency-domain (FD) metal detectors are capable of detecting metal objects in the ground. However, when water, and in particular salt water, environments are encountered, TD metal detectors are preferred over FD metal detectors due to the large EMI response of the water that can mask the typically small metal signature. Therefore, FD metal detectors are not used in underwater or wet environments.

Both TD and FD metal detectors are used for metal discrimination. However, each metal detector type has operating limits when metal discrimination measurements are needed. Typically, TD metal detectors can operate over a high bandwidth compared to FD metal detectors, thus, high bandwidth targets are best resolved with TD metal detectors. In the mid bandwidth range, FD metal detectors can operate with higher power efficiency than TD metal detectors. Metal targets with a mid bandwidth response are best measured with FD metal detectors. In the low bandwidth range, TD metal detectors can operate more efficiently compared to FD metal detectors.

Since there are advantages to both types of EMI metal detectors, it would be advantageous to be able to combine the time-domain and frequency-domain methods into one metal detector in an efficient manner to take advantage of the best features of both technologies.

SUMMARY

A metal detector capable of operating in both a time-domain mode and a frequency-domain mode includes a transmitter component and a receiver component. The transmitter component includes a transmitter coil that can generate both an AC and pulsed DC current or voltage source for frequency-and time-domain operation respectively. The AC signal is impressed on the pulsed DC signal such that while the transmitter coil is charging, frequency-domain sensing is occurring and when the transmitter coil is switched off (pulsed), time-domain sensing is occurring. The receiver component is in a balanced configuration with respect to the transmitter to ensure that both time-and frequency-domain modes can operate with the magnetic field receiver.

DETAILED DESCRIPTION

Figure 1:
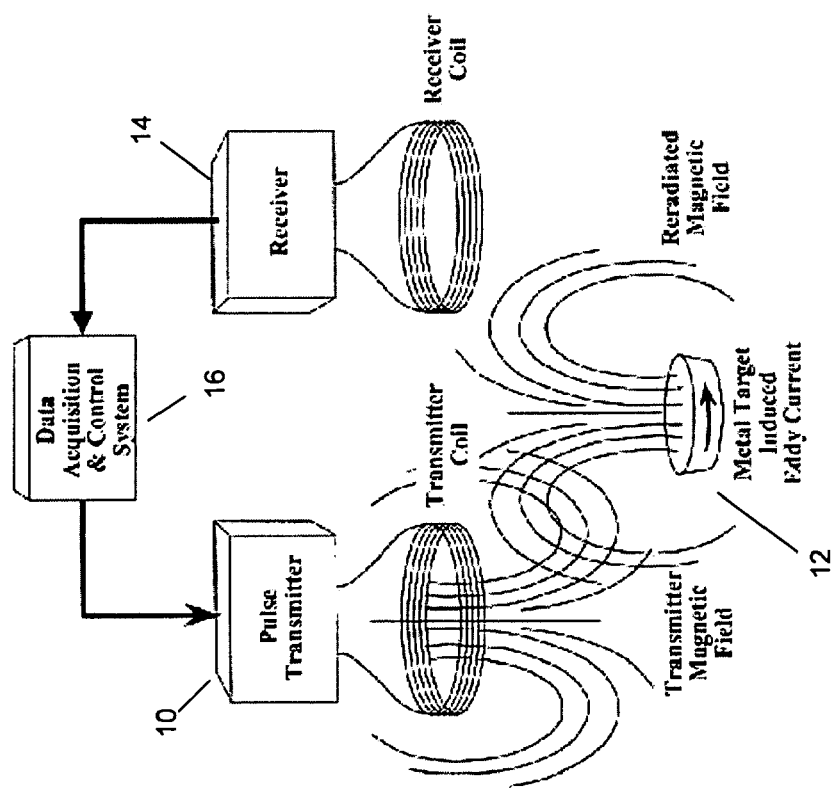
FIG. 1 is a block diagram of a conventional time-domain prior art EMI metal detector and method of operation.

FIG. 1 is a block diagram of a conventional pulsed (time-domain) prior art EMI metal detector and method of operation. A current loop transmitter 10 is placed in the vicinity of the buried metal target 12, and a steady current flows in the transmitter 10 for a sufficiently long time to allow turn-on transients in the soil (soil eddy currents) to dissipate. The transmitter current pulse is then abruptly turned off. As the current pulse shuts off, the magnetic field around the transmitter coil 10 suddenly collapses. According to Faraday's Law, the collapsing magnetic field 10 induces an electromotive force (emf) in nearby conductors 12. This emf causes eddy currents to flow in the conductor. Because there is no energy to sustain the eddy currents, they begin to decrease with a characteristic decay time that depends on the size, shape, and electrical and magnetic properties of the conductor. The decay currents generate a secondary magnetic field, the time rate-of-change of which is detected by a receiver coil 14. The magnetic field generated by the nearby conductor can also be measured by other magnetic field sensors known in the art.

A data acquisition and control unit 16 controls the operation of the metal detector including switching the transmitter coil (pulse transmitter) 10 on/off and processing data detected by the receiver coil 14.

Figure 2:
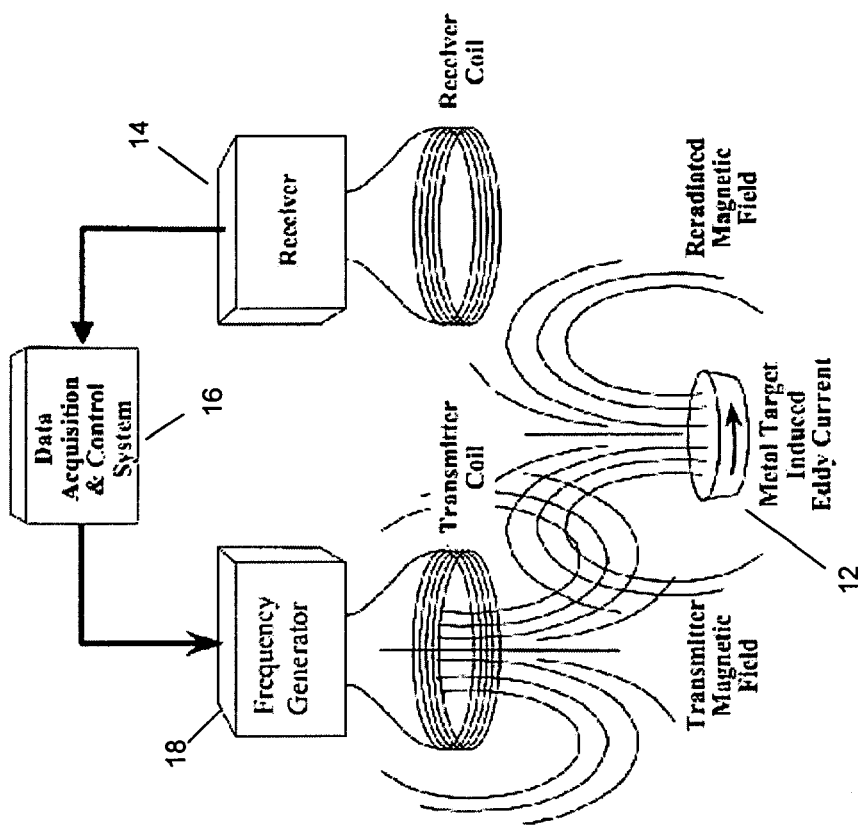
FIG. 2 is a block diagram of a conventional frequency-domain prior art EMI metal detector and method of operation.

FIG. 2 is a block diagram of a conventional frequency-domain prior art EMI metal detector and method of operation. A frequency generator transmitter 18 is placed in the vicinity of the buried metal target 12. The alternating current in the transmitter coil interacts like a weakly coupled transformer with the metal target 12 causing a variation in the signal recovered by receiver coil 14.

A data acquisition and control unit 16 controls the operation of the metal detector including the transmitter coil (frequency generator) 18 and processing data detected by the receiver coil 14.

Figure 3:
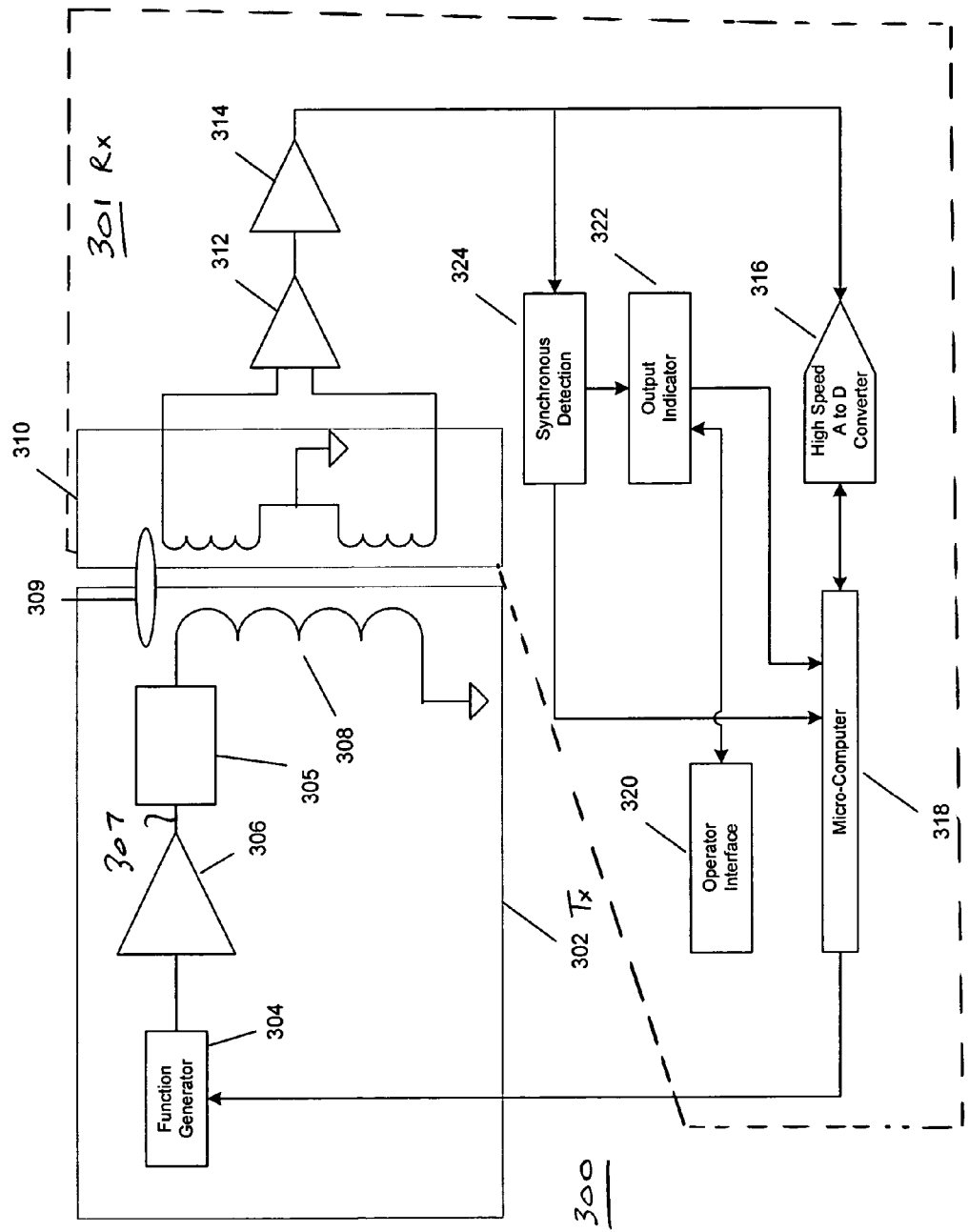
FIG. 3 is a block diagram of a dual-mode (TD and FD) metal detector according to the present invention.

The present invention combines the operation of a time-domain metal detector and a frequency-domain metal detector into a single device 300 operating in each mode nearly simultaneously. FIG. 3 is a block diagram of the basic device 300 according to an embodiment. Simultaneous time-domain and frequency domain metal detector 300 includes a metal detector receiver 301 and a metal detector transmitter 302.

Transmitter 302 includes a function generator 304 that generates a waveform having both a direct current component for time-domain operation and an oscillatory wave current component for frequency-domain operation. The waveform components are summed via a summing amplifier 306 into a single composite transmitter current signal 307. A transistor switch 305 within the transmitter 302 is closed to allow composite current signal 307 to flow through a transmitter coil 308 for a length of time to charge the transmitter coil during this time period. The switch 305 is then turned off abruptly to stop the flow of current signal 307 through the transmitter coil 308. An example waveform for composite current signal 307 as applied to transmitter coil 308 is depicted in FIG. 5b, described below.

After the current 307 to the transmitter coil 308 is turned off, induced eddy currents in a nearby metal object 309 are sensed by a receiver coil 310 of receiver 300. That is, for a period of time after the transmitter current signal 307 is turned off, receiver 301 operates in the time-domain mode to sense the eddy currents from metal objects. In other words, the period when the transmitter coil 308 is charging is not used in the time-domain mode to sense metal objects. Instead, during this charging period the oscillatory wave current component impressed on the transmitter coil current signal induces fields used by receiver 301 for frequency-domain mode metal detection. That is, during the charging period, receiver 301 operates in the frequency-domain mode to detect metal targets. Thus, the metal detector 300 is either sensing metal objects in a time-domain mode after transmitter coil charging or a frequency-domain mode while transmitter coil charging, all based on a time-domain mode duty cycle.

The receiver coil 310 has been configured in a balanced or gradiometer configuration in FIG. 3 for illustrative purposes. A balanced configuration is necessary for both time-domain and frequency-domain modes of operation because the primary frequency-domain signal is as much as 100,000 times the frequency-domain signal from the metal object 309. The primary frequency-domain signal must be removed or 'bucked' out of the receiver coil 301 or its associated electronics so as to detect the small metal target signal. Other methods, however, could achieve the purpose of a balanced receiver coil configuration to remove the effect of the primary frequency-domain magnetic field generated by the transmitter and could be implemented without departing from the scope of the present invention.

In the time-domain sensing mode in receiver 301, signals sensed by the receiver coil 310 are passed through first a wideband differential preamplifier 312 and then a multistage wideband amplifier 314 to increase the signal strength corresponding to the sensed metal object. The amplified signal is then sent to a high speed digital-to-analog converter 316 that is under the control of a microcomputer 318. An operator interface 320 is coupled with an output indicator 322 to provide an audible and/or visual indication of sensed metal to the user.

In the frequency-domain mode of receiver 301, the large primary excitation magnetic field used to excite the metal target must be bucked-out from the receiver coil sensed signal since the metal target magnetic field is many orders of magnitude less than the primary field. The balanced coil configuration accomplishes this task. Synchronous detection 324 is used to detect the signal from receiver coil and the metal object. The synchronous detection 324 is also coupled with the output indicator 320 and microcomputer 318. Digital synchronous detection is also known in the art and can be implemented directly in a microcomputer 318 after the signal is digitized by a high speed digital-to-analog converter 316.

Figure 4:
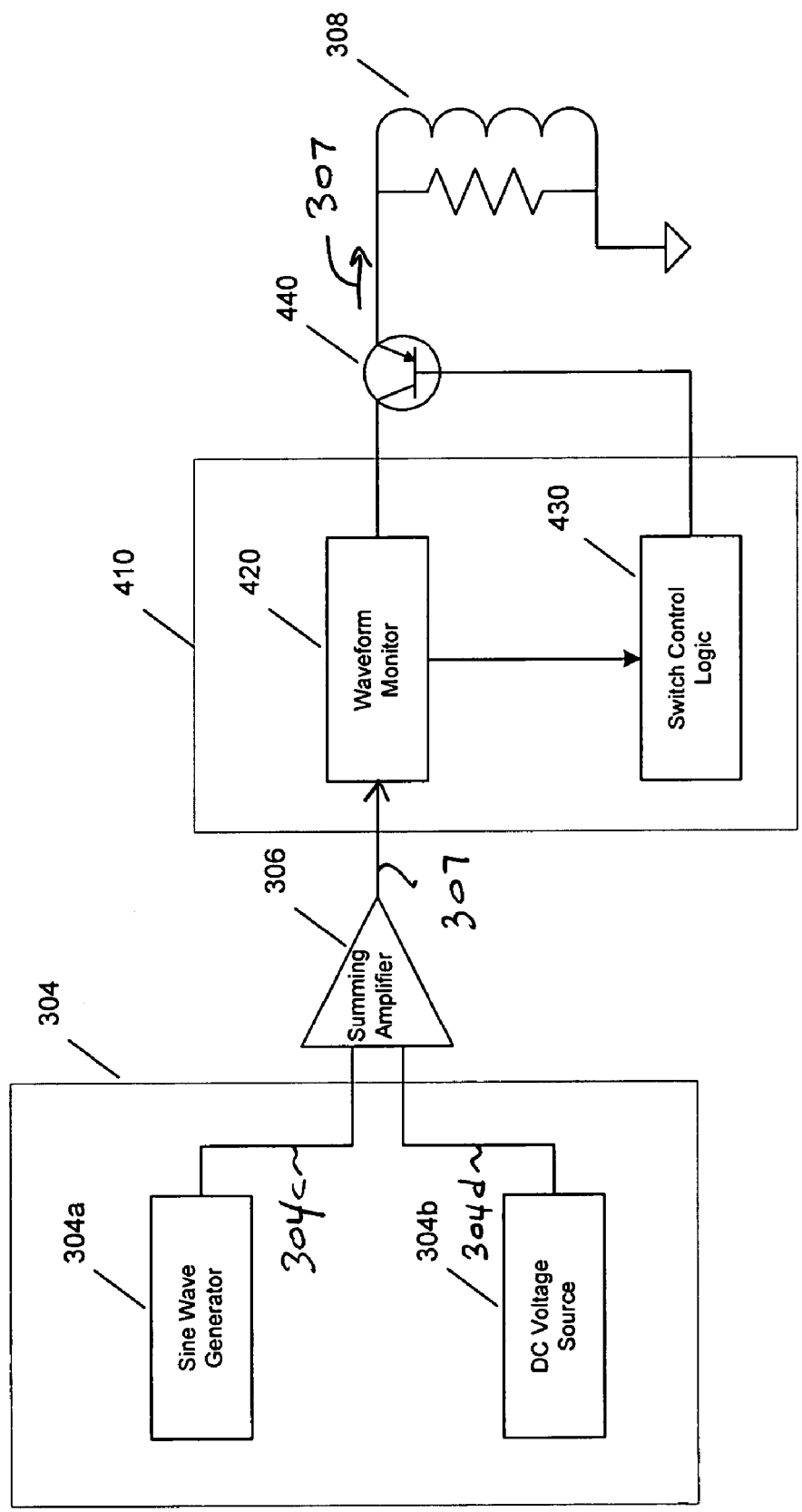
FIG. 4 is a block diagram of transmitter specifics of the present invention.

As depicted in FIG. 4, function generator 304 includes a Sine Wave Generator 304a to generate a direct current (DC) signal 304c for time-domain operation, and a DC Voltage or Current Source 304b to generate an oscillatory wave current (AC) signal 304d for frequency-domain operation. Summing amplifier 306 combines signals 304c and 304d into composite current signal 307. Other methods of generating composite signal 307 could be used, including, but not limited to, a digital to analog converter controlled by a computing device amplified by a suitable electronic circuit such as transistors or IC amplifier or switching amplifier.

A sensing circuit 410 comprised of a waveform monitor 420 and a switch control logic 430 is added to sense when the peak of the AC signal is reached so that a transistor switch 440 can be activated at the peak current in the transmitter coil. The transistor switch 440 is used to switch the current off in the transmitter coil 308 so that a time-domain signal can be observed from the metal target. Typically, the coil charging period is long enough so that many cycles of the AC signal can be implemented for good signal detection by the receiver coil 310.

Figure 5A:
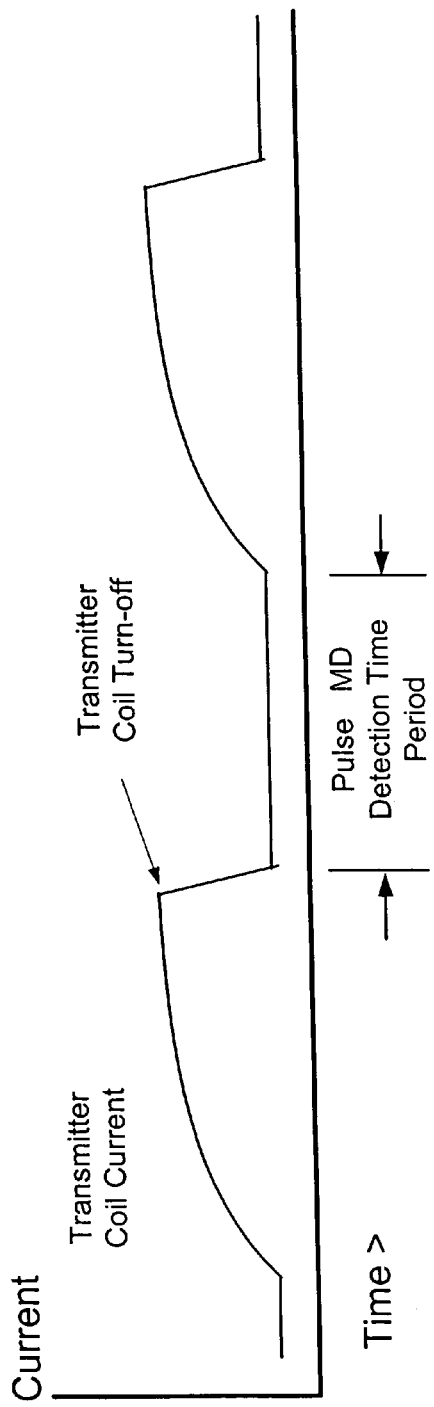
FIG. 5a is a timing diagram illustrating the operation of a time-domain metal detector.
Figure 5B:
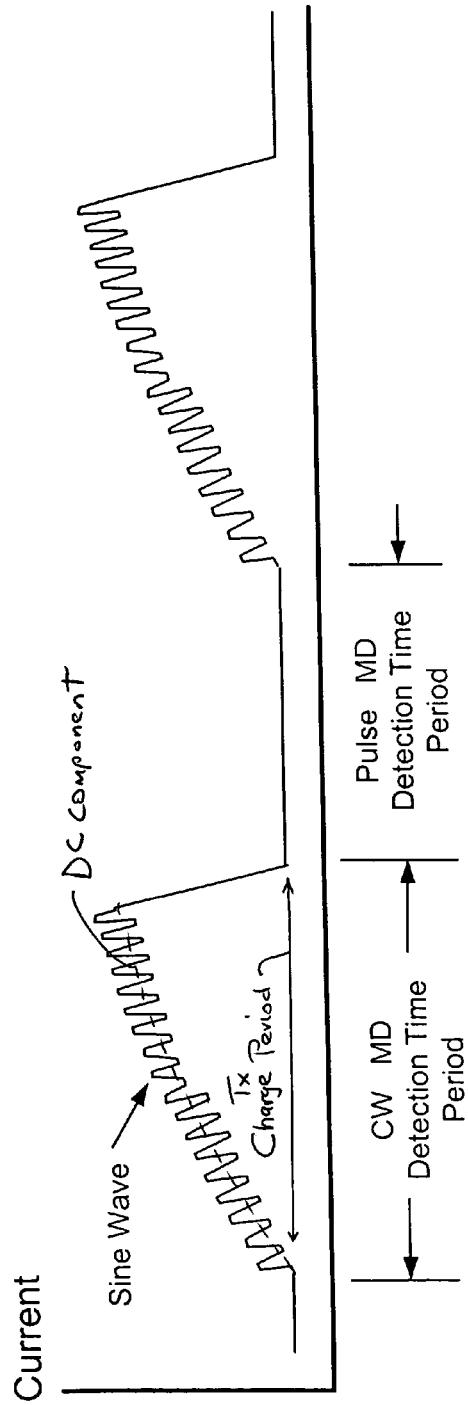
FIG. 5b is a timing diagram illustrating the operation of the dual mode time-domain and frequency-domain metal detector.

To further illustrate the invention, FIG. 5a shows a conventional time-domain metal detector waveform and timing. Typically, during the charge period no metal detection is performed. When the transmitter coil is abruptly shut off, time-domain metal detection can occur following a brief decay period. This process is repeated over and over.

As shown in FIG. 5b, the present invention uses the coil charging time period (time-domain mode "down time") to operate in the frequency domain mode. An AC signal is impressed on the charging transmitter coil current thus allowing the metal detector 300 to sense metal in a frequency-domain mode while the time-domain mode is charging. The metal detector 300 thus alternates between time-and frequency-domain modes of operation.

The single frequency sine wave shown in the FIG. 5b can be other AC signals such as multiple frequencies, different frequencies on successive pulses, triangle waveform or a chirp signal (changing frequency with time).

While operating in frequency-domain mode the metal detector provides a low power, high sensitivity search mode that achieves good classification for targets having a moderate frequency response as well as good detection for targets buried deeply. While operating in time-domain mode the metal detector provides good ground response in difficult soil conditions. Time-domain mode also provides good classification for targets having high and/or low frequency responses and can detect shallow voids and void/metal effects. The end result is a single device that combines the best characteristics of time-domain and frequency-domain search methods.

It is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A metal detector configured to operate in both a time-domain mode and a frequency-domain mode, the metal detector comprising:
   a transmitter comprised of:
      a transmitter coil;
      a generator for generating an oscillatory wave current signal to be applied to the transmitter coil for operating in the frequency-domain mode;
      a direct current source for generating a current signal to be applied to the transmitter coil for operating in the time-domain mode;
      means for combining the oscillatory wave current and direct current signals into a single composite transmitter current signal; and
      a transmitter coil switch for switching the single transmitter current signal on and off to the transmitter coil, and
   a receiver comprised of:
      a magnetic field detector for sensing eddy currents in nearby metal targets;
      first receiver components configured to operate in the time-domain mode to detect metal targets; and
      second receiver components configured to operate in the frequency-domain mode to detect metal targets,
      wherein the metal detector operates in
         (i) the frequency-domain mode while the transmitter coil switch is on to charge the transmitter coil with the direct current signal, and
         (ii) the time-domain mode while the transmitter coil switch is switched off.

2. The metal detector of claim 1, wherein the second receiver components include a synchronous detector.

3. The metal detector of claim 1 wherein the means for combining the oscillatory wave current and direct current signals into a single transmitter current signal is comprised of a summing amplifier.

4. The metal detector of claim 1 wherein the magnetic field detector for sensing eddy currents in nearby metal targets is comprised of a receiver coil in a balanced configuration with respect to the transmitter coil.

5. The metal detector of claim 1, wherein the first receiver components include:
   an analog-to-digital converter (ADC) coupled to an output of the magnetic field detector;
   a micro-computer coupled to an output of the ADC; and
   an output indicator coupled to the micro-computer.

6. A method of operating a metal detector including a transmitter coil for inducing a detectable magnetic field indicative of a nearby metal target, comprising:
   during a first time period
      (a) applying to the transmitter coil a composite current signal including an oscillatory current signal and a DC current signal; concurrently
      (b) performing frequency domain metal detection based on a first magnetic field induced as a result of step (a); and
   during a second time period following the first time period
      (c) removing the composite current signal from the transmitter coil; and then
      (d) performing time domain metal detection based on a second magnetic field induced as a result of step (c).

7. The method of claim 6, further comprising repeating steps (a) through (d).

* * * * *